United States Patent [19]

Uemura et al.

[11] 4,406,494
[45] Sep. 27, 1983

[54] HEAD LINING MOUNTING STRUCTURE

[75] Inventors: Yukio Uemura, Yokohama; Masayoshi Horike, Yokosuka, both of Japan

[73] Assignee: Nissan Motor Co., Ltd., Yokohama, Japan

[21] Appl. No.: 266,784

[22] Filed: May 26, 1981

[30] Foreign Application Priority Data

Jun. 4, 1980 [JP] Japan ............................ 55-77731[U]

[51] Int. Cl.³ .............................................. B62D 25/06
[52] U.S. Cl. ...................................... 296/214; 52/222; 52/718
[58] Field of Search ................ 296/214, 210; 52/718, 52/222, 273(U.S. only); 24/255 R, 255 BS, 259 R (U.S. only), 259 FS (U.S. only), 335, 336, 338, 339

[56] References Cited

U.S. PATENT DOCUMENTS

| | | | |
|---|---|---|---|
| 3,120,938 | 2/1964 | Lucas | 24/339 |
| 3,393,006 | 7/1968 | Resch et al. | 296/214 |
| 3,433,526 | 3/1969 | Field et al. | 296/214 |
| 3,508,730 | 4/1970 | Knezo, Jr. | 24/339 |
| 4,275,919 | 6/1981 | Okamoto et al. | 296/214 |

*Primary Examiner*—Robert R. Song
*Assistant Examiner*—Dennis Pedder
*Attorney, Agent, or Firm*—James C. Wray

[57] ABSTRACT

A head lining mounting structure for anchoring each end of a head lining to a vehicle structural member such as a roof rail includes an anchoring means formed in a multi-stepped manner to taken up irregularities in dimension or elongation of a head lining, thereby preventing slacks or wrinkles of the head lining and facilitating mounting the head lining on the vehicle structural member and therefore avoiding a spoiling of a sense of beauty or fine quality in a vehicle compartment due to mounting conditions of the head lining.

6 Claims, 7 Drawing Figures

FIG_3
PRIOR ART
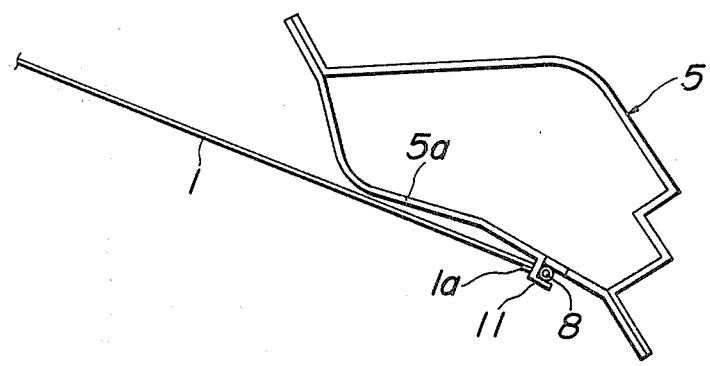
FIG_4
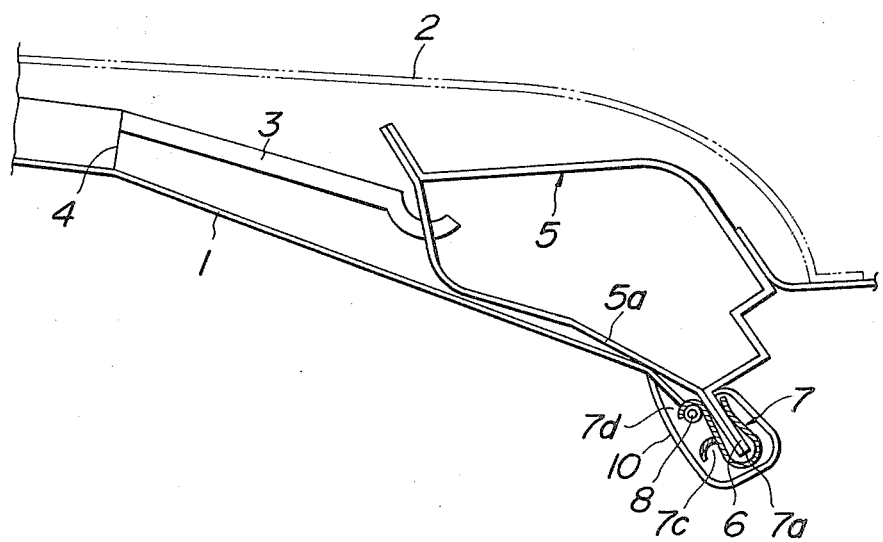

HEAD LINING MOUNTING STRUCTURE

BACKGROUND OF THE INVENTION

1. Field of the Invention

This invention relates to a headlining for an automobile, and more particularly to a mounting structure for an end of the headlining.

2. Description of the Prior Art

With hanging type headlining, there has been proposed a construction, for example as shown in FIG. 1, for mounting an end of the headlining. The headlining 1 is hung by bands 4 in the form of loops supported by a plurality of listing wires 3 arranged below a roof panel 2. The headlining 1 has at its front and rear ends welts which are fitted in retainers (not shown) for fixing the front and rear ends. The headlining 1 is further provided at its lateral sides with loop portions 1a enclosing thin wires 8 which are anchored to clips 7 previously fitted on flanges 6 of roof rails 5, as shown in the drawing.

Referring to FIG. 2, each lateral side of the headlining 1 is provided with a notch which forms an anchoring portion 9 exposing a part of the enclosed wire 8. The clip 7 is made of a thin metal plate having a curved portion 7a for receiving the flange 6 of the roof rail and a hook portion 7b adapted to engage the anchoring portion 9 of the headlining 1 to maintain a determined tension in the headlining. A reference numeral 10 illustrates a roofside molding.

As an alternative, referring to FIG. 3, a rail roof member 5a is partially cut to form a tab 11 raised from the surface of the member 5. An anchoring portion 9 of a headlining 1 is anchored to the tab 11.

With such mounting structures of the prior art, headlinings of extensible materials such as vinyl chloride have been successful to some extent. However, if headlinings are made of fabrics, their poor extensibility may often make it impossible to fix them exactly to vehicle bodies due to irregularities in dimensional tolerance and elongation of the linings, and if it is possible to fix them, there is a tendency for them to be slack or wrinkled and thus spoil a sense of beauty and fine quality.

SUMMARY OF THE INVENTION

It is a primary object of the invention to provide an improved headlining mounting structure for a vehicle, which eliminates all the above disadvantages of the prior art.

It is a further object of the invention to provide an improved headlining mounting structure whose anchoring portion of a headlining or whose hooks of a clip or tab provided in a vehicle structural member are formed in a multi-stepped manner to accommodate irregularities in dimension or the like of a headlining, thereby preventing an inability to mount the headlining on the vehicle structural member and preventing slack and wrinkles in the headlining.

The invention will be more fully understood by referring to the following detailed specification and claims taken in connection with the appended drawings.

BRIEF DESCRIPTION OF THE DRAWINGS

FIG. 3 is an explanatory sectional view showing a headlining mounting structure without using a clip of the prior art as mentioned above;

FIG. 4 is an explanatory sectional view illustrating one embodiment of a headlining mounting structure according to the invention;

DETAILED DESCRIPTION OF THE PREFERRED EMBODIMENT

Figure 1:
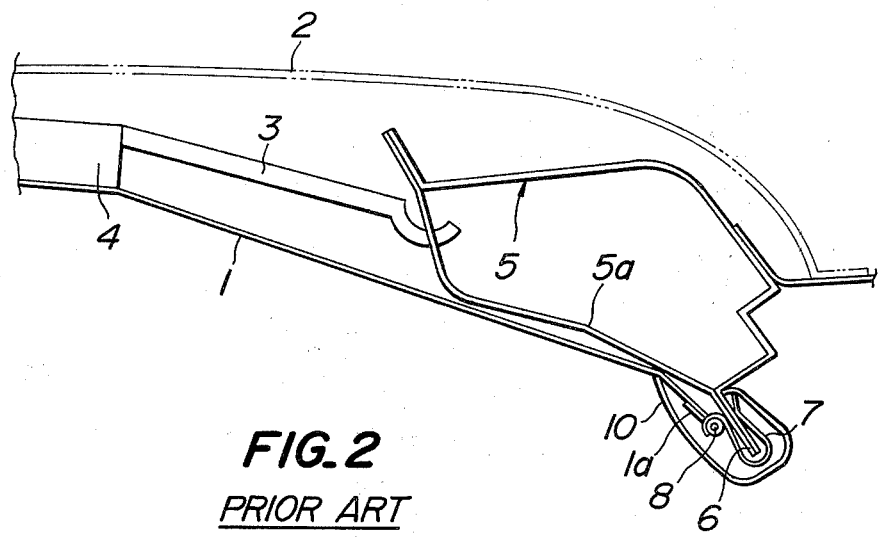
FIG. 1 is an explanatory sectional view showing a headlining mounting structure using a clip of the prior art as mentioned above.
Figure 2:
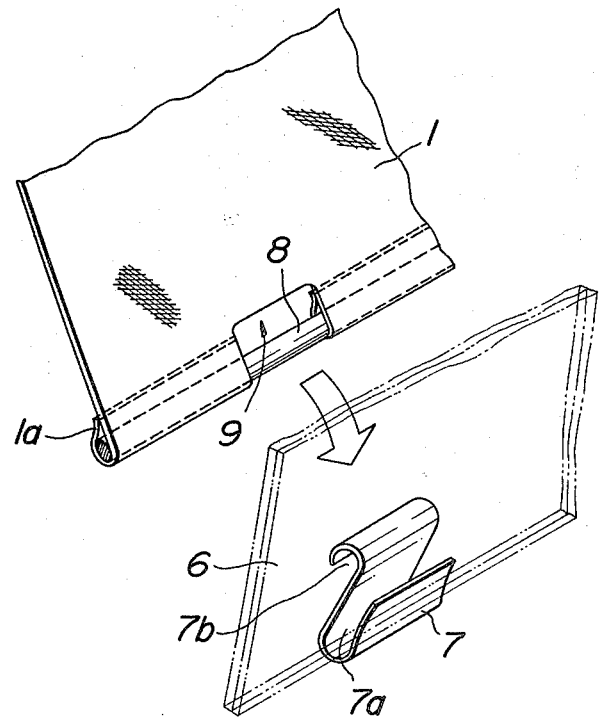
FIG. 2 is a perspective view illustrating the headlining and clip shown in FIG. 1.
Figure 5:
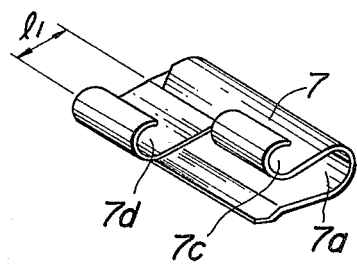
FIG. 5 is a perspective view showing a clip used for the headlining mounting structure according to the invention.

Referring to FIG. 4 illustrating a first embodiment of the invention, a novel clip 7 is formed in a stepwise form. An anchoring portion 9 of a head lining 1 is conventional. As shown in FIG. 5, the clip 7 includes a curved portion 7a adapted to be fitted on a flange 6 of a roof rail 5 and a short hook 7c and long hook 7d which differ in length in a direction of tension (transverse direction of a vehicle) and are formed side by side integral with the clip 7. The difference $l_1$ in length between the short and long hooks 7c and 7d is equivalent to a dimensional tolerance of the overall width of the headlining 1.

With this arrangement, when the clip 7 is fitted on the flange 6 of the roof rail 5 prior to the incorporation of the headlining in the vehicle, the clip 7 embracing the flange 6 is fixed thereto with the aid of the resilient force of the clip itself. The anchoring portion 9 of the head lining 1 is anchored to the clip 7 which has previously been fixed to the roof rail 5. If the width of the cut headlining 1 is smaller than a standard dimension, the long hook 7d is used for securing the anchoring portion 9. If the width of the headlining 1 is larger than the standard dimension, the short hook 7c is used.

In this manner, even if there are irregularities in dimension and elongation of the headlining, the hooks 7c and 7d are selectively used depending upon the actual dimension of the headlining 1, thereby accommodating irregularities in dimension which prevent the headlining from being unable to be secured to the vehicle body and thereby avoiding slack and wrinkle in the headlining.

Figure 6:
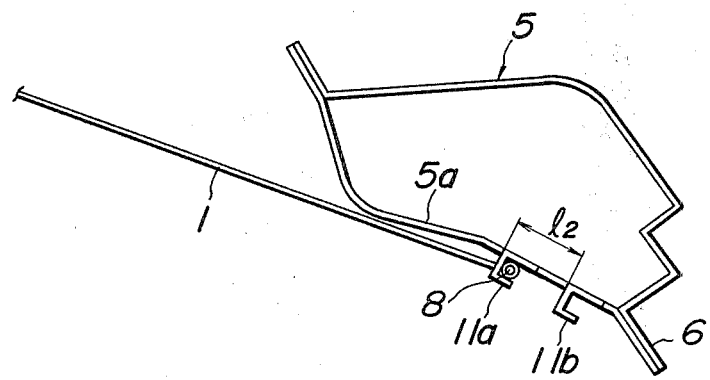
FIG. 6 is an explanatory sectional view illustrating a vehicle structural member provided with two tabs used for a mounting structure of another embodiment of the invention.

FIG. 6 illustrates other embodiment of the invention, which is different from the previous embodiment in the feature that a roof rail member 5a is provided with two tabs 11a and 11b cut and raised from the member and arranged side by side in the direction of tension (transverse direction of the vehicle) without providing the clip 7 as in the previous embodiment. The difference $l_2$ in length between the tabs 11a and 11b is equivalent to a dimensional tolerance of the overall width of the headlining 1 in the same manner as in the previous embodiments. This embodiment shown in FIG. 6 can of course bring about functions and effects similar to those of the previous embodiments.

Figure 7:
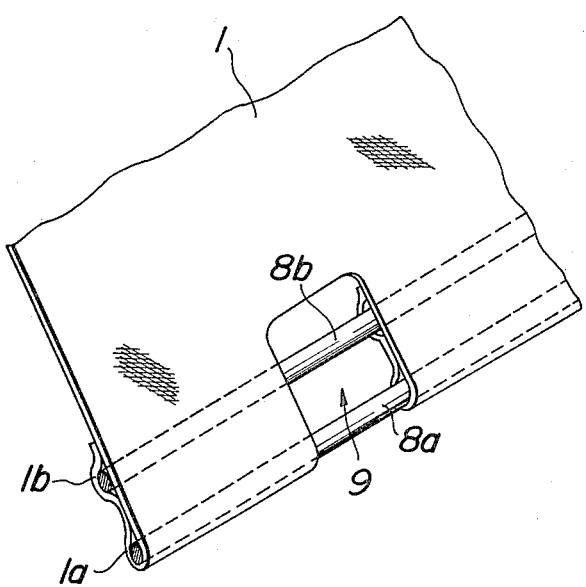
FIG. 7 is a perspective view illustrating a lateral side of a headlining of a further embodiment of the invention.

FIG. 7 illustrates a further embodiment of the invention, wherein the end of a headlining 1 has two wires 8a and 8b, but tabs 11a and 11b and clip 7 are similar to those in the previous embodiments. As shown in FIG. 7, the headlining 1 is provided at each side with two loops 1a and 1b in which two wires 8a and 8b are respectively inserted in parallel with each other. The side of the headlining is provided with a notch to expose parts of the two wires 8a and 8b so as to form a two-stepped anchoring portion 9.

With this embodiment, there are advantages in addition to the above functions and effects in that the clips and tabs shown in the first and second embodiments can be used or the multi-stepped clips and multi-stepped tabs can be used.

As can be seen from the above description, with the headlining mounting structure according to the invention wherein the anchoring portion formed at the end of a headlining, or the hooks of the clip or tabs adapted to engage the anchoring portion, are formed in a multi-stepped manner, even if there are irregularities in dimension and elongation of the headlining, they are taken up to facilitate mounting the headlining on a vehicle structural member and to prevent slack and wrinkles in the headlining and therefore to avoid spoiling of a sense of beauty or fine quality in a vehicle compartment due to mounting conditions of the headlining.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A headlining mounting structure for anchoring each end of a headlining to a vehicle structural member such as a roof rail, said headlining mounting structure comprising anchoring means having a notch formed in a lateral end of said headlining to expose thereat a part of a first wire enclosed by a loop of the end of the headlining, and two hooks arranged side by side in a transverse direction of the vehicle on said vehicle structural member to engage said part of said wire exposed in said notch of the headlining.

2. A headlining mounting structure as set forth in claim 1, wherein a clip having a curved portion engages said vehicle structural member and said hooks comprise a short hook and a long hook which are different in length in a transverse direction of the vehicle and are formed integral with said clip.

3. A headlining mounting structure as set forth in claim 1, wherein said hooks comprise tabs provided in said vehicle structural member.

4. A headlining mounting structure as set forth in claim 1, wherein said anchoring means further comprises a second wire enclosed by said loop and in parallel with and spaced from said first wire inside of said end of the headlining.

5. A headlining mounting structure as set forth in claim 4, wherein a clip having a curved portion engages said vehicle structural member and said hooks comprise a short hook and a long hook which are different in length in a transverse direction of the vehicle and are formed integral with said clip.

6. A headlining mounting structure as set forth in claim 4, wherein said hooks comprise tabs provided in said vehicle structural member.

* * * * *